DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 417

T901,025

NOVEL PHOTOGRAPHIC COUPLERS

Philip Thiam Shin Lau, 345 St. Andrews Drive, Rochester, N.Y. 14626

Filed Dec. 3, 1971, Ser. No. 204,726
Int. Cl. G03c *1/40, 7/00*
U.S. Cl. 96—100
No Drawing. 37 Pages Specification

A class of color photographic elements containing azine magenta dye-forming 5-hydroxy-1,3-benzoxathiol-2-one color photographic couplers of the formula

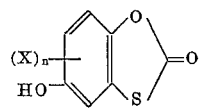

wherein each X substituent is individually defined as a halo group; an alkyl group; an alkylene group; an aryl group; a thio- or oxy-connected heterocyclic group; an alkoxy group; a thioether group; an alkyl acyl group, an aryl acyl group, or otherwise defined as a ballasting moiety of the type commonly attached to couplers of a non-diffusible type designed to be incorporated in photographic emulsions; and wherein *n* is defined as an integer of 0–3; also light-sensitive silver halide emulsions containing a non-diffusible coupler within the above class, a color photographic developer composition containing a diffusible coupler within the above class; and a process for producing magenta photographic azine dyes of the formula

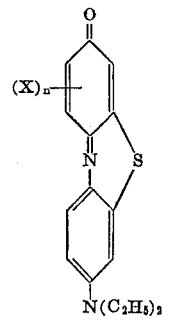

wherein the substituent groups are defined as above, by contacting with oxidized color developing agent.